Sept. 8, 1970 G. DI GIACOMO ET AL 3,527,534
APPARATUS AND METHOD FOR MEASURING THE ANGULAR
DISTORTION DISPLACEMENT OF A
SPECIMEN BY AUTOCOLLIMATION
Filed July 8, 1968 4 Sheets-Sheet 1

INVENTORS.
GIULIO DIGIACOMO
IRVING CANNER
BY Ernest J Weinberger
Louis B. Cappleton
ATTORNEYS Sept. 8, 1970     G. DI GIACOMO ET AL     3,527,534
APPARATUS AND METHOD FOR MEASURING THE ANGULAR
DISTORTION DISPLACEMENT OF A
SPECIMEN BY AUTOCOLLIMATION Filed July 8, 1968     4 Sheets-Sheet 2

INVENTORS.
GIULIO DI GIACOMO
IRVING CANNER
BY Ernest J. Weinberger
Lon B. Appleton
ATTORNEYS

INVENTORS.
GIULIO DIGIACOMO
IRVING CANNER

INVENTORS.
GIULIO DIGIACOMO
IRVING CANNER

United States Patent Office 3,527,534
Patented Sept. 8, 1970

3,527,534
APPARATUS AND METHOD FOR MEASURING THE ANGULAR DISTORTION DISPLACEMENT OF A SPECIMEN BY AUTOCOLLIMATION
Giulio DiGiacomo, Brooklyn, N.Y., and Irving Canner, Brookline, Mass., assignors to the United States of America as represented by the Secretary of the Navy
Filed July 8, 1968, Ser. No. 743,191
Int. Cl. G01b 11/16, 11/27
U.S. Cl. 356—32      6 Claims

ABSTRACT OF THE DISCLOSURE

Autocollimated light is used in conjunction with a penta-prism, an adjustable specimen supporting platform and a novel optical jig attachable to the ends of the specimen, to measure any angular displacement or distortion between said ends of said specimen.

---

The invention described herein may be manufactured and used by or for the Government of the United States of America for governmental purposes without the payment of any royalties thereon or therefor.

BACKGROUND OF INVENTION

Field of invention

This invention relates generally to optical measurements and testing and more particularly pertains to an autocollimated optical system for precisely ascertaining the physical distortion of structural components.

Description of prior art

Presently available means for measurement of fabrication distortion in bulky alloy specimens which have undergone heat treatment, stress relieving and machining operations is limited in the possible precision attainable. These means include the use of strain gauges, interferometers, X-ray diffraction which are inherently inaccurate and difficult to calibrate and operate. Additionally, they are not all suitable for use with bulky specimens.

SUMMARY OF INVENTION

The apparatus includes a specific jig having a pair of optical flats which jig is affixed to the specimen. The specimen is provided with conical apertures that are aligned with the tightening screw and the V groove of the jig. Metallic spheres are disposed in the V groove and between the screw and an aligned specimen aperture so as to allow adjustment therebetween. The method entails first zeroing an autocollimator with respect to a reference horizontal plane by the use of a penta-prism. The jig is mounted on the specimen and both are supported on a platform whose legs are then adjusted until the horizontal flat of the jig is parallel to the axis of the autocollimator. The autocollimator is then zeroed to the vertical flat and a vertical mirror. The flat is now shifted to another portion of the specimen and the autocollimator is zeroed to the mirror. This permits measurement of the Z and X angular components of the specimen between the two jig positions. The autocollimator is zeroed to the reference plane through the penta-prism and the y deviation angular component is ascertained thus giving the initial $\alpha_{xz}$, $\alpha_{zy}$ and $\alpha_{yx}$ deviations. The specimen is then treated, machined to be operated upon by some process which is normal and remeasured as above to provide the treated or final angular deviations. The differences therebetween indicate the distortion imparted to the specimen during treatment.

This method since it is independent of the usual factors in optical measurements provides repeatable and extremely accurate measurements through the use of an optical jig.

An object of the present invention is to provide a reliable, accurate, repeatable and easy to operate method of measuring distortion of bulky specimens.

Another object is the provision of an optical jig for attachment to the specimen which is simple, accurate, and aligned with apertures in the specimen so as to convey the imparted distortion to the optical measuring system.

A further object is to provide a novel accurate, simple, and relatively inexpensive optical system for the measurement of specimen distortion.

Other objects and advantages will appear from the following description of an example of the invention, and the novel features will be particularly pointed out in the appended claims.

DESCRIPTION OF THE PREFERRED EMBODIMENT

Figure 1:
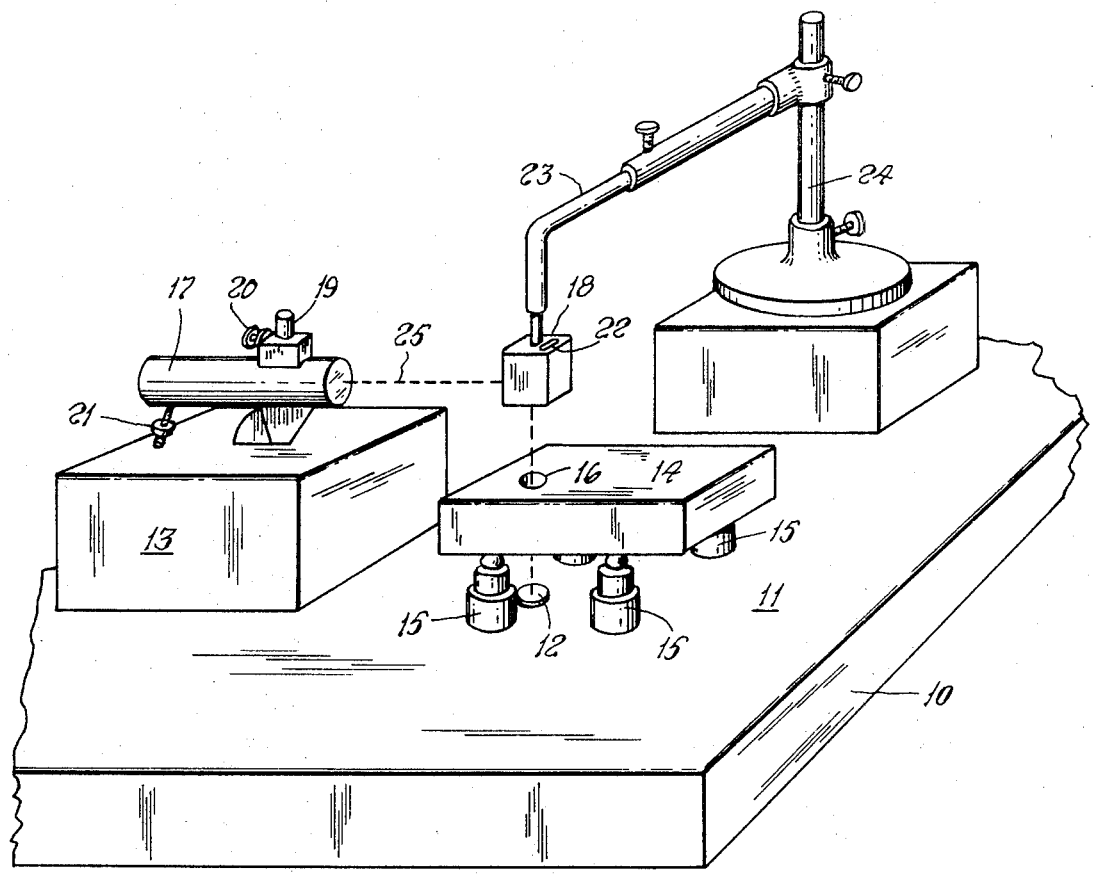
FIG. 1 illustrates the arrangement in perspective for the initial horizontal zeroing of the autocollimator to a reference plane in accordance with this invention.

In the illustrated embodiment of FIG. 1 a reference plane which in this showing is a granite slab 10 having an upper flat plate surface 11 in which is disposed an upwardly directed optical flat 12. The reference slab 10 carries a support member 13 and a specimen platform 14 whose legs 15 are vertically adjustable. The platform 14 is provided with a vertical hole 16 therethrough aligned with the optical flat 12. An autocollimator 17 is disposed on the upper face of support 13 and directs its optical light beam toward a penta-prism 18 which, in turn, is disposed above the hole 16 in the specimen platform so as to redirect the beam toward the optical flat 12 of the reference slab 11.

The autocollimator 17 or source of a narrow pencil-like light beam, is provided with an optical viewer 19, an angular readout means 20 which indicates the angular separation between the incident and reflected light beam. Additionally it has a means for horizontal angular adjustment such as vertically adjustable leg 21. The penta-prism 18 carries on its upper surface a bubble level 22 and is supported by telescoping arm 23 which is affixed to a rotatable stand 24 by clamps etc.

With the arrangement of components as shown the leg 21 is adjusted in the vertical until the reflected beam from the optical flat 12 retraces the optical path of the incident beam that is, the reflected image falls at the center of the field of viewer 19. This adjustment is referred to as zeroing the autocollimator 17 to the reference plane or slab 11 and assures that the light beam 25 emanating from the collimator is parallel to the reference plane.

Figure 2:
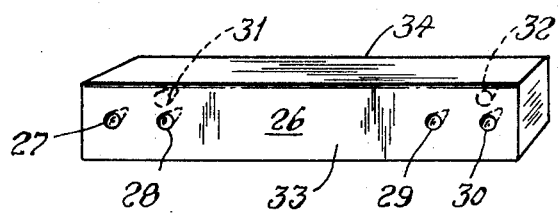
FIG. 2 shows in perspective a typical specimen with the alignment apertures illustrated thereon.

The specimen 26 as illustrated in FIG. 2 may take a variety of shapes and forms but a bar as shown which is simple and serves the explanatory purpose. The specimen 26 is provided with right-angle conical holes 27–32. Three at each end of the specimen and two holes (27, 28 and 29, 30) in one surface 33 and intermediate another hole (31, 32) in the opposite face 34.

Figure 3:
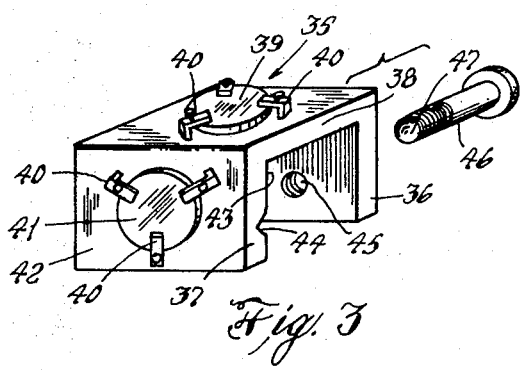
FIG. 3 illustrates an embodiment of an optical jig made in accordance with the principles of this invention.

A jig 35 illustrated in FIG. 3 is provided to support the specimen 26 and to permit adjustment thereof. The jig itself is rigid and generally U shaped with the two legs 36 and 37 perpendicular to the arm 38. The upper face of arm 38 carries an optical flat 39 which is affixed thereto by adjustable clamps 40 that permit alignment of said flat 39. A similar flat 41 is carried by one of the arms 37 on its outer surface 42 while its inner face 43 is provided with a longitudinal V shaped slot or groove 44. The opposite arm 36 has a threaded aperture 45 extending therethrough and in alignment with the slot 44. The arm 36 via the aperture 45 carries movable shaft means or in this case a screw 46 whose threads mate with those of the aperture. The end of the screw is recessed in the form of a right angle cone as at 47 and is movable toward and away from the groove 44.

Figure 4:
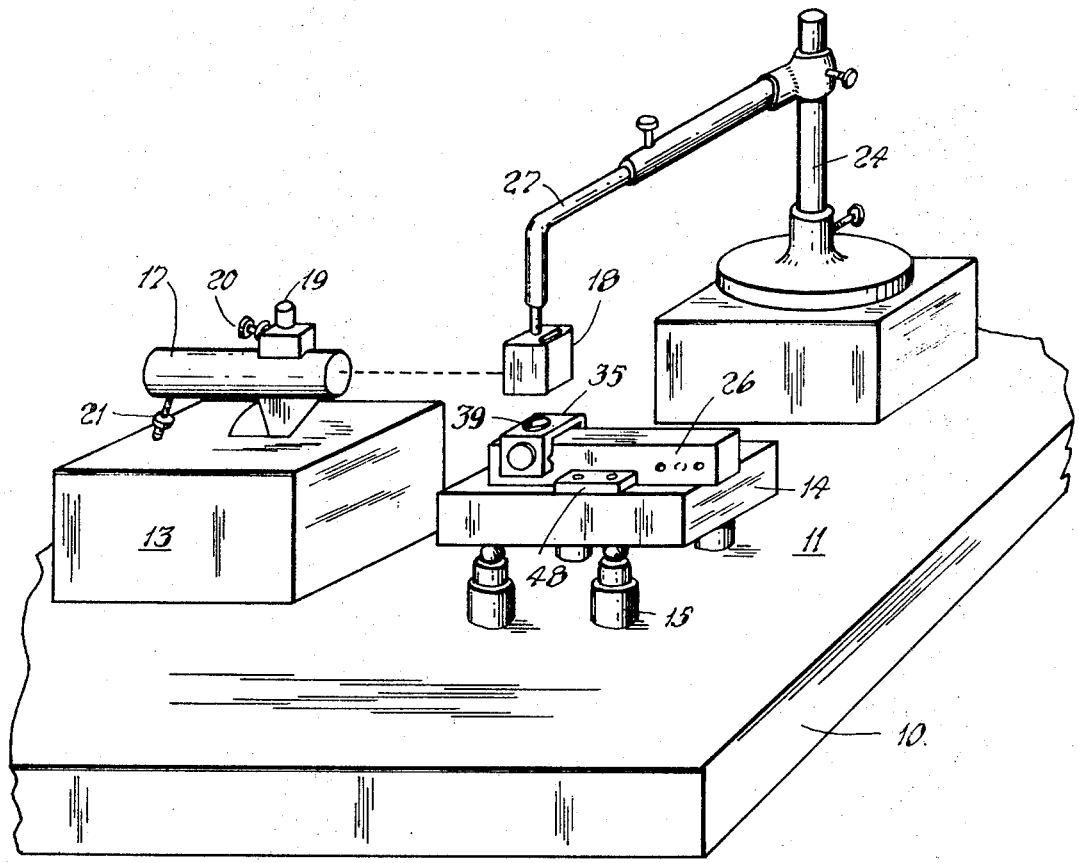
FIG. 4 illustrates in perspective the jig mounted on the specimen and the arrangement for horizontally zeroing the platform supporting the specimen and the jig with the autocollimator.

FIG. 4 shows the same arrangement of components as FIG. 1 except that a bracket clamp 48, bolted to the specimen platform, carries the specimen 26 to one end of which the jig 35 has been attached. Since the collimator 17 has not been moved with respect to the reference slab 10 its beam axis is in a plane parallel to the slab. With the penta-prism 18 positioned above the jig 35, the collimated beam is directed toward the upper jig flat 39 and then reflected back to the autocollimator. The specimen platform legs are adjusted until the image reflected from optical flat 39 falls on the center of the viewer field. The upper flat 39 is now parallel to the reference slab 10.

Figure 5:
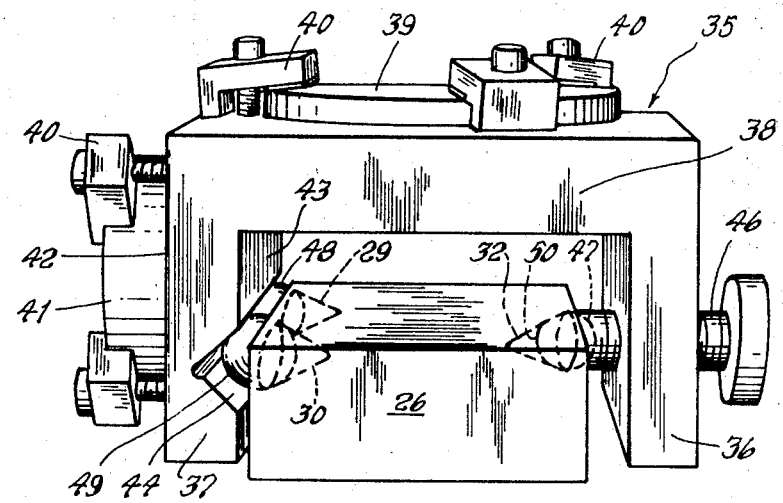
FIG. 5 is a cross-section view of the jig mounted on one end of the specimen.
Figure 6:
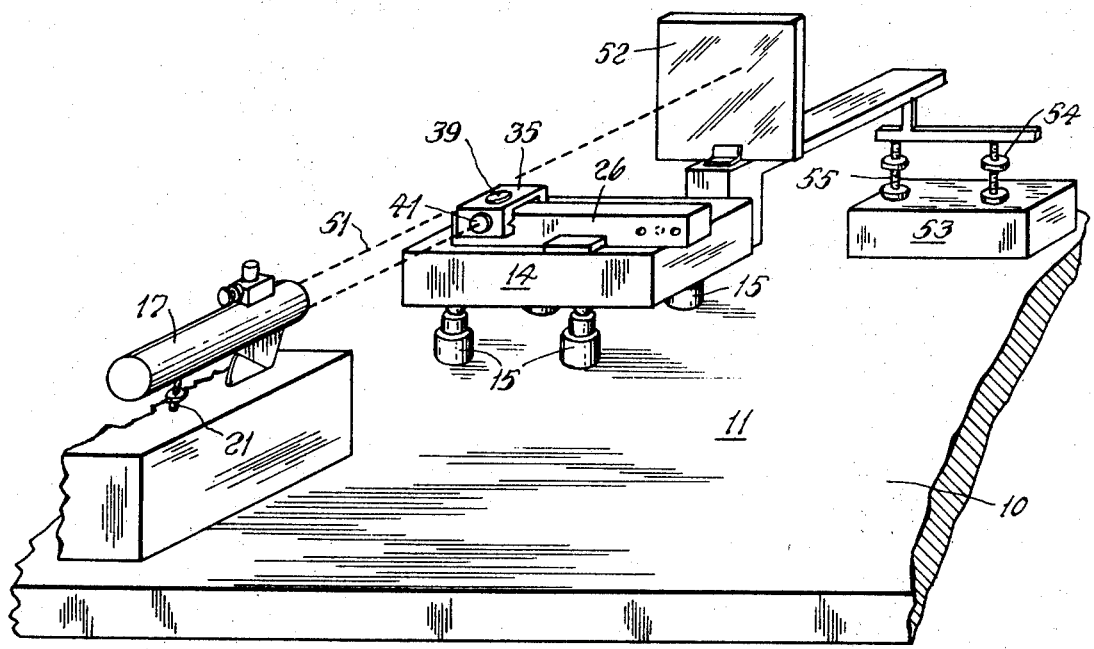
FIG. 6 shows in perspective the arrangement for vertically zeroing the collimator and the mirror with respect to the flat of the jig.

FIG. 5 illustrates a specimen 26 to which the jig has been affixed. Two of the conical holes 29 and 30 of the specimen are disposed opposite the V groove 44 of the jig with a pair of metallic spheres or ball bearings 48 and 49 disposed therein and also within the conical holes 29 and 30. These spheres are aligned therein and provide the only physical contact between the specimen and the jig and adjustment therebetween. The opposite conical hole 32 in the specimen partially carries another sphere 50. The sphere 50 is also carried by the conical recess 49 of the screw 46.

The specimen platform 14 remains fixed while the autocollimator 17 is moved so as to direct its beam toward the side optical flat 41 of the jig 35 and the collimator is zeroed thereto by adjusting leg 21. A portion of the collimator beam 51 strikes a vertical flat mirror 52 which is rigidly coupled to a platform 53 via adjusting screws 54 and 55 for movement of the mirror about a vertical axis and about a horizontal edge. The adjusting screws 54 and 55 are turned until the reflected image from the mirror coincides with that from the side optical flat 41. Under these conditions the plane of the mirror is parallel to the side flat 41 and from the prior adjustment the top flat 39 is parallel to the reference slab 10. Consequently the specimen (and jig) are specifically oriented with respect to fixed spacial references.

Figure 7:
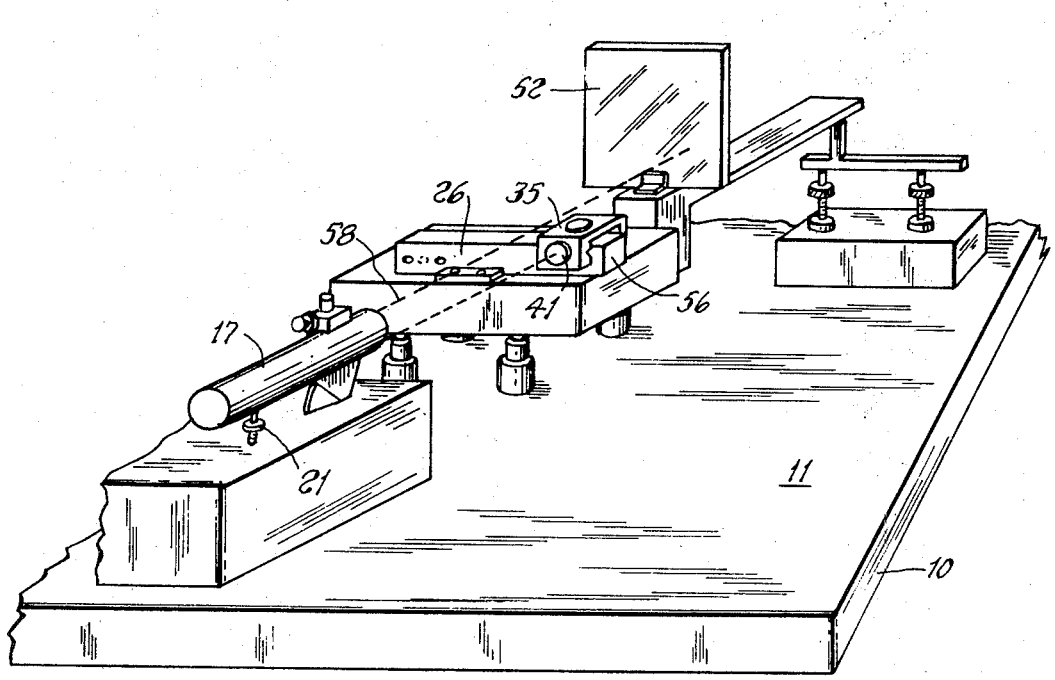
FIG. 7 illustrates in perspective the arrangement for the measurement of the X and Z angular deviations of the specimen.

With all the components fixed the jig 35 is shifted to the opposite end 56 of the specimen 26 as shown in FIG. 7 and engaged as previously described to the specimen via the conical holes herein. Of course, it is clear that two identical jigs could have been employed thus eliminating the necessity of moving the single jig. Since the autocollimator 17 was also moved so as to direct a portion of its beam toward the side flat 41 and another portion 58 toward the mirror 52, it is now zeroed with respect to the mirror 52. After zeroing the collimator the image reflected from the side optical flat 41 will be angularly displaced from the center of the collimator viewer by the X and Z angular components. The X component corresponds to a rotation of the specimen about the Z axis which is referred to as $\alpha^i{}_{YZ}$ while the Z-component, $\alpha^i{}_{YZ}$ corresponds to a rotation about the X axis. These angular values are the initial displacement of one side of the specimen with respect to the other.

Figure 8:
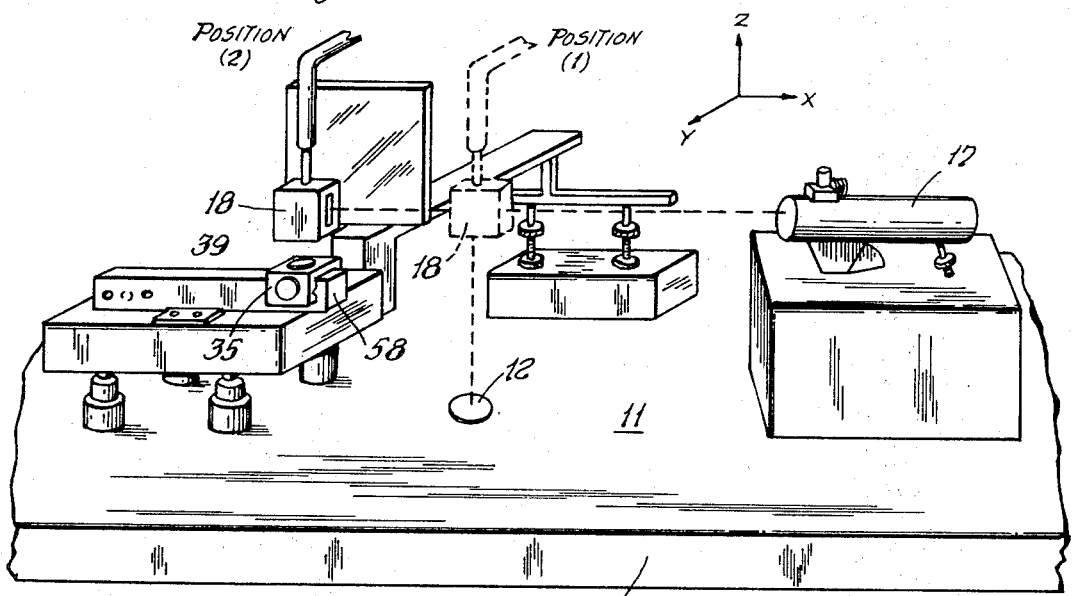
FIG. 8 illustrates the technique and arrangement for the measurement of the y angular deviation of the specimen in accordance with the principles of this invention.

The next or fifth step provides a measurement of the specimen rotation about the y axis. As illustrated in FIG. 8 the autocollimator 17 is moved into position so as to direct the beam toward the specimen face end 58 or along the X axis. The collimator is again zeroed via the penta-prism in position 1 with the optical flat 12 to the reference slab 10. The penta-prism is then moved to position 2 so that it is directly above the top flat 35 of the jig 35. It should be noted that rotation of the penta-prism in the X–Z plane cannot affect the measurement of $\alpha^i{}_{XZ}$. Rotation of the penta-prism about the y axis can only produce a decrease in beam intensity but not a displacement thereof. Therefore the angular displacement of the beam reflected from the top flat 39 provides the y axis rotation or $\alpha^i{}_{XZ}$.

It is clear now that the initial measurements have been made and that they indicate the angular displacement between the ends of the specimen about the three principal axes. The specimen can now be subjected to whatever process is necessary and that may introduce distortion. This includes the most common namely, machining, heat treating and welding. The prior described steps are thereafter repeated to provide $\alpha^f{}_{XZ}$, $\alpha^f{}_{ZY}$ and $\alpha^f{}_{YX}$ which are the final angular displacements of the specimen. The angular changes in the specimen are therefore:

$$\alpha^f{}_{XZ} - \alpha^i{}_{XZ} = \Delta\alpha_{XZ}$$
$$\alpha^f{}_{ZY} - \alpha^i{}_{ZY} = \Delta\alpha_{ZY}$$
$$\alpha^f{}_{YX} - \alpha^i{}_{YX} = \Delta_{YX}$$

The angular values are correct based on the fact that the distortion of the specimen is uniform since the specimen dimensions are large relative to the distortion. It is clear that the conical holes in the specimen serve to convey to the special jig the actual distortion of the specimen. In turn the jig optical flats provide the means of actual reflective measurement. Based on measurement already made this optical system will reproduce within a second of arc and can be used on bulky structural components, such as radio telescopes, gimbals, antennas and inertial guidance instrumentation.

It will be understood that various changes in the details, materials, and arrangements of parts (and steps), which have been herein described and illustrated in order to explain the nature of the invention, may be made by those skilled in the art within the principle and scope of the invention as expressed in the appended claims.

We claim:

1. A jig for attachment to a specimen having a pair of conical holes in one side face thereof and another conical hole in an opposite face thereof which comprises:
   a rigid U shaped member having an arm and a pair of depending legs perpendicular thereto,
   one of said legs being provided with a V groove on the inner face extending lengthwise thereof,
   movable shaft means carried by said opposite leg aligned with and movable in a direction toward said groove,
   an optical flat carried on the outer surface of said arm and means for adjustably confining said flat thereon,
   another optical flat carried on the outerface of said one leg and means for adjustably confining said another flat thereon,
   said specimen being disposed between said legs of said jig,
   locking adjustable means disposed partially in said groove and partially in said pair of conical holes, second locking adjustable means being partially disposed in said another hole and said shaft means.

2. The jig according to claim 1 wherein said shaft means is a screw and said opposite leg is provided with a thread aperture therethrough aligned with said groove and mating with said screw confined therein.

3. The jig according to claim 2 wherein the end of said screw proximate said groove is provided with a generally conical recess.

4. The jig according to claim 3 wherein said locking adjusting means are a pair of spheres and said another adjusting means is also a sphere.

5. The method of optically measuring the distortion of a specimen which comprises the steps of:
  providing a series of attaching means at opposite ends of said specimen, and
  affixing thereto at one end a jig carrying a pair of perpendicular optical flats,
  zeroing an autocollimator light beam with a fixed horizontal reference plane,
  adjusting said specimen to zero one of said flats with said collimator light beam,
  vertically aligning a mirror with the other of said optical flats,
  positioning said jig on said opposite end of said specimen,
  reflectively aligning said collimator with said mirror,
  detecting the angular displacement of said other of said flats with respect to said mirror,
  detecting reflectively the angular displacement of the said one of said flats with respect to said reference plane,
  whereby the angular distortion displacement between said ends of said specimen has been detected.

6. The method according to claim 5 further including, subjecting said specimen to physically distorting forces, and
  repeating all of said steps of claim 5,
  whereby the difference in angular displacements detected will be an indication of the distortion introduced by said forces.

References Cited
UNITED STATES PATENTS 2,797,485   7/1957   Lewis.

RONALD L. WIBERT, Primary Examiner

J. ROTHENBERG, Assistant Examiner

U.S. Cl. X.R.

73—88; 248—481; 350—299; 356—138, 152